United States Patent [19]
Kesselring

[11] 3,873,914
[45] Mar. 25, 1975

[54] FLUX VALVE APPARATUS FOR SENSING BOTH HORIZONTAL AND VERTICAL COMPONENTS OF AN AMBIENT MAGNETIC FIELD

[75] Inventor: Donald J. Kesselring, Phoenix, Ariz.
[73] Assignee: Sperry Rand Corporation, Great Neck, N.Y.
[22] Filed: July 18, 1973
[21] Appl. No.: 380,523

[52] U.S. Cl. ................................. 324/43 R, 33/361
[51] Int. Cl. ............................................. G01r 33/02
[58] Field of Search................ 324/43 R, 47; 33/361

[56] References Cited
UNITED STATES PATENTS

| | | | |
|---|---|---|---|
| 2,539,411 | 1/1951 | Esval et al. | 324/43 R |
| 2,710,942 | 6/1955 | Emerson | 324/43 R |
| 2,998,727 | 9/1961 | Baker | 33/361 |
| 3,127,559 | 3/1964 | Legg et al. | 324/43 R |
| 3,573,610 | 4/1971 | Kesselring | 324/43 R |
| 3,628,254 | 12/1971 | Burmeister | 33/357 |
| 3,758,850 | 9/1973 | Snyder | 324/43 R |

*Primary Examiner*—Robert J. Corcoran
*Attorney, Agent, or Firm*—Howard P. Terry

[57] ABSTRACT

A magnetometer for sensing the magnitude and direction of the earth's magnetic field along three orthogonal axes employing a conventional multilegged flux valve member for sensing the magnitude and direction of the components of the earth's magnetic field in one plane and further including a plurality of magnetometer elements supported symmetrically between the legs of said valve member with their sensitive axes disposed so as to sense the components of the earth's magnetic field in a second plane normal to said first plane. In one preferred embodiment, the multilegged valve member has three legs equiangularly disposed in a common plane, the output windings thereof being conventionally Y-connected to provide an output proportional to the direction and magnitude of the magnetic field in said plane of said member, the three further magnetometer dements are supported symmetrically between these angularly disposed legs. Each of the plurality of further magnetometer elements comprise a single linear saturable core magnetometer having its output summed together with the others to provide an output proportional to the direction and magnitude of the magnetic field in planes normal to the plane of the multilegged valve member.

12 Claims, 5 Drawing Figures

FLUX VALVE APPARATUS FOR SENSING BOTH HORIZONTAL AND VERTICAL COMPONENTS OF AN AMBIENT MAGNETIC FIELD

BACKGROUND OF THE INVENTION

1. Field of the Invention

The present invention relates generally to magnetometer devices and more particularly to magnetometer for sensing the magnitude and direction of the earth's magnetic field and useful as a navigation reference for maneuverable vehicles, such as marine vessels and aircraft.

Magnetometers or flux valves have long been used in compass systems for providing navigation reference. Typical and conventional forms of flux valves and flux valve systems of which the present invention relates is disclosed in many patents assigned to the same assignee as the present invention; pertinent configurations being shown in U.S. Pat. Nos. 2,383,460; 2,852,859; 2,998,727; 3,573,610; 3,628,254 and 3,641,679. U.S. Pat. Nos. 2,383,460; 3,573,610 and 3,641,679 illustrate a typical multilegged flux valve for sensing the horizontal component of the earth's magnetic field and to which the present invention directly pertains; while Pat. Nos. 2,852,859; 2,998,727 and 3,628,254 illustrate typical flux valve compass systems in which the flux valve of the present invention may be conveniently employed. It will be appreciated, however, that the foregoing cited patents are illustrative rather than limiting, it being understood that the sensor of the present invention may be embodied in other flux valve configurations and systems requiring a measure of the direction and magnitude of the vertical component as well as the horizontal components of the earth's magnetic field.

In this connection, the present invention is a significant improvement over the flux valve sensor disclosed in copending U.S. Pat. No. 3,758,850 issued Sept. 11, 1973 entitled "Total Magnetic Field Sensor" in the name of George W. Snyder and assigned to the same assignee as the present invention.

In the following specification, the multilegged flux valve, in its preferred embodiment, a three-legged valve, for sensing the normal horizontal components of the earth's field will be referred at times as the flux valve fundamental. It will, of course, be understood that the invention in its broader aspects is applicable in flux valves having, for example, four or more horizontal field sensor legs, the vertical field sensors being arranged symmetrically within the angular spaces between the horizontal field sensor legs.

2. Description of the Prior Art

As illustrated in the above-mentioned U.S. Pat. No. 3,628,254, showing system-wise a typical application of the present invention; a single magnetometer member is associated with a standard multilegged flux valve member and is disposed so as to sense components of the magnetic field normal to those components sensed by the multilegged element. However, this simplisite arrangement has been found to be unsuitable for sensing the magnitude and direction of the normal vertical component of the earth's magnetic field with the degree of sensitivity and accuracy required for precision navigation systems, nor to provide a mechanical configuration adaptable to systems requiring pendulous flux valves, e.g., compensated pendulous systems similar to those shown in the above U.S. Pat. No. 2,852,859. For example, the vertical field sensor of U.S. Pat. No. 2,628,254 is mechanically unsymmetrical with the flux valve fundamental and hence is subject to induced errors upon heading changes. Furthermore, this patent design is not readily adaptable to a pendulous configuration of the type shown in the above U.S. Pat. No. 3,641,679.

Also, the total magnetic field sensor disclosed in the above-referenced Synder application has certain drawbacks. One of these is its large size and the mechanical complexity of the vertical field sensor collector elements and associated excitation windings which render this design difficult to fabricate, assemble, calibrate and test, all contributing to a high cost of manufacture. In addition, the electrical characteristics of this design require considerably more electronics and circuitry and is more subject to cross-coupling interferences. As in the U.S. Pat. No. 3,628,254 configuration, it is also impossible or difficult to render the sensor pendulous within conventional or reasonable housing dimensions.

SUMMARY OF THE INVENTION

The magnetic field sensor of the present invention is a substantial improvement over those sensors discussed above and eliminates or significantly reduces the mechanical and electrical problems associated therewith. In the structure of the present invention, the capability of sensing the vertical component of the earth's field is achieved with but a relatively simple modification of a standard multilegged flux valve fundamental as illustrated in the above-mentioned U.S. Pat. No. 3,573,610, for sensing the normally horizontal components of the earth's field, the modification comprising mounting a corresponding plurality of single-leg magnetometer elements, with their sensitive axes vertical, symmetrically between the symmetrical horizontally disposed legs of the fundamental. The arrangement is such as to permit the complete sensor to be fixed or pendulous and housed in the standard housing.

As described in the above-referenced U.S. Pat. Nos. 2,383,460 and 3,573,610, the flux valve fundamental is formed with three relatively equiangularly arranged core legs such, for example, as three relatively radially extending core legs arranged at angles of 120° with respect to each other. The sensitive magnetometer element is arranged to lie in a common plane, and in one application is pendulously supported in the earth's field so that the three legs extend outwardly in horizontal fashion so as to sense the horizontal component of the earth's field for azimuthal determinations. The core structure is formed of high magnetic permeability material. An exciting winding is energized with suitable alternating current at a fundamental frequency producing an alternating flux in the core members of the sensitive element which serves to pulse the earth's field threading the core legs, and pickup windings which are associated respectively with the core legs will produce a double frequency signal output in response to the earth's field flux, which signal output represents fairly closely a cosine function of the angle between a particular leg and the direction of the earth's field. The pickup windings are connected together in polycircuit or polyphase fashion to supply an output similar to that derived from a three-phase selsyn transmitter. The legs of the sensitive element are provided with accurate collectors which extend laterally from the outer peripheral ends of the legs. These are also made of high permeability magnetic material and serve to increase the density of the earth's field flux in the leg inductors.

The magnetic core and winding assembly is supported on a non-magnetic, for example, plastic, base structure of generally circular or flat cylindrical shape provided with suitable radial channels, shoulders, etc. for receiving and mounting said core, collector and coil elements. Symmetrically arranged in the pieshaped portions of the support base between the horizontal spiders and arcuate collectors are three small magnetometer elements oriented with their sensitive axes normal or at right angles to the plane of the fundamental. Each of these elements comprises dual coils would on an insulated aluminum bobbin surrounding a core element of highly permeable magnetic material. The circuit including these coils is connected so that saturating current flows through the two coils in opposite directions, preferably at the same frequency as the fundamental excitation resulting in a second harmonic proportional to the component of the magnetic field normal to that which the fundamental senses. The coils can be connected in series or parallel so that their outputs are aiding.

The three small, symmetrically arrranged vertical field sensor coils provides not only a minimum change to the standard fundamental but also a minimum electromagnetic interaction between the horizontal and vertical sensors and obtains an averaging effect, for example, an effect unaffectd by heading changes.

Additionally, the arrangement of the present invention permits the inclusion of the vertical field sensors in a standard pendulous flux valve housing or case simply by providing corresponding small holes in the pendulous mass to accept any protruding end of the vertical field sensor coils. Alternatively, the sensitive element including the vertical field sensors may be rigidly secured in the case where fixed axis total field sensing is required or desired.

The summed outputs of the vertical field sensors may be suitably demodulated using the same double frequency reference as the fundamental flux valve system thereby providing a phase-locked system.

BRIEF DESCRIPTION OF THE DRAWINGS

A preferred embodiment of the present invention is illustrated in the attached drawings wherein.

DESCRIPTION OF THE PREFERRED EMBODIMENT

Figure 1:
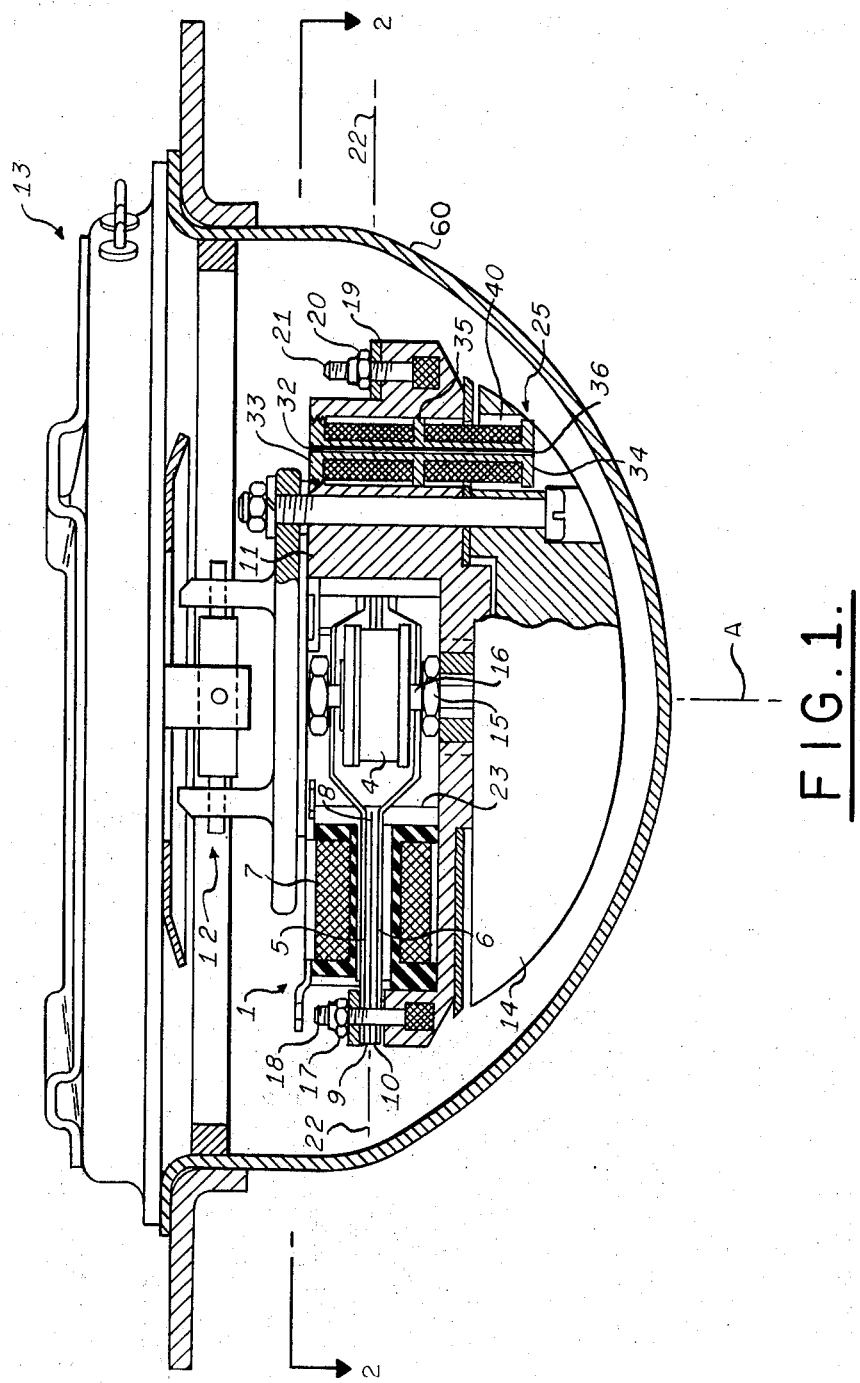
FIG. 1 is a vertical sectional view through the three axis sensor of the present invention taken on line 1—1 of FIG. 2.
Figure 2:
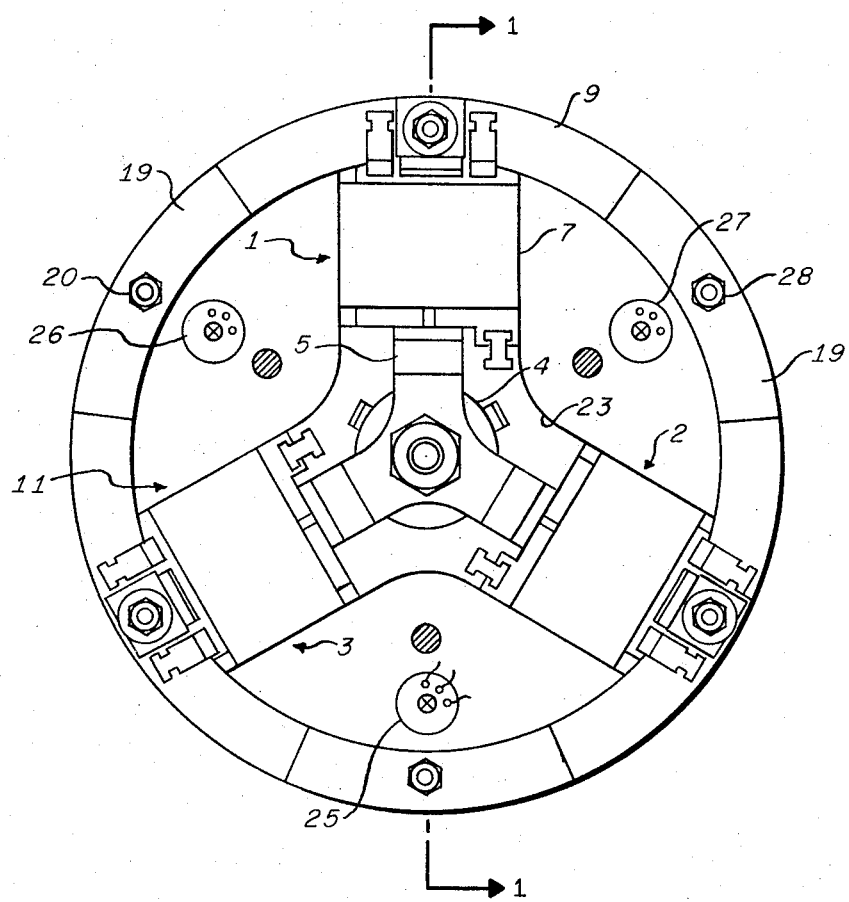
FIG. 2 is a plan view of the three axis sensor taken on line 2—2 of FIG. 1.

Referring first to FIGS. 1 and 2 which serve to illustrate a preferred form of magnetometer or flux valve for use in compass systems, the three, 120° relatively angularly disposed, legs of the core structure being shown generally at 1, 2 and 3. A centrally disposed exciting core and coil 4 serves to generate the exciting magnetomotive force and, when energized with alternating current, causes an exciting flux to flow or circulate first in one and then the opposite direction through all of the core legs. As shown in FIG. 1, each core leg comprises upper and lower thin flat inductors 5 and 6, respectively, of highly permable magnetic material which lie in closely spaced parallel relation in the zone thereof surrounded by the pickup coil 7. Throughout this zone a thin insulator strip 8 is preferably interposed between the inductors. Toward the center of the valve the inductors are separated to a greater extent in bifurcated fashion to accommodate the exciting core and coil 4. Arcuate collectors 9 and 10 are respectively affixed in contact with the upper and lower inductors of the legs to increase the density of the earth's field threading the leg inductors.

As illustrated in FIG. 1, the sensitive element of the flux valve comprising the core and coil structure is mounted within a suitably recessed base member 11 which, in the pendulous embodiment, is supported by means of a universal joint indicated generally at 12, on the upper wall of a case or housing 13 which is precisely mounted in the vehicle by means of a suitable mounting flange. The housing 13, in this embodiment, is accurately positioned and fastened, for example, in a wing or vertical stabilizer of an aircraft, and the sensitive element of the flux valve within the base 11 is supported to hand in pendulous fashion so that the leg inductors may lie in generally horizontal planes. A heavy mass 14 of non-magnetic material, such as brass, is provided for imparting pendulous moments to the flux valve and is secured to the lower side of base member 11 by means of bolts and nuts as shown. A dome-shaped enclosure 60 is normaly affixed to the upper wall of the housing to encompass the sensitive element and ordinarily contains a damping fluid, as is well known in the art.

It is to be noted that the sensitive element comprising the core and coil structure is designed to lie substantially symmetrical about the median plane 22 as shown in FIG. 1 and we can consider this plane as a normally horizontal plane in the disclosed pendulous embodiment. The base member, being pendulous, is designed to support the sensitive element in this fashion and in order to insure proper positioning of the core legs and collectors, the base 11 is recessed or contoured as at 23 to receive the sensitive element such that the latter is firmly and securely held against the surfaces of the base. Securing means such as the nut 15 on the central mounting stud 16 and nuts 17 on studs 18 embedded in the base, and clamping plates 19 and nuts 20 on studs 21 embedded in the base are carefully tightened up to provide the proper degree of restraint. By being positioned firmly against the base surface at the center and at intermediate points and peripheral zones of the sensitive element, the core members, collectors and the like are held in a generally horizontal position, symmetrical about the median plane so as to respond as fully as possible only to the horizontal component of the earth's field.

The aforegoing as set forth a brief description of a typical multilegged flux valve for sensing the magnitude and direction of the components of the earth's magnetic field laying in the plane 22 of the legs 1, 2 and 3. If a more detailed description of the structure and operation of the flux valve fundamental is desired reference may be made to the above-referenced U.S. Pat. Nos. 2,383,460; 3,573,610 and 3,641,679.

In accordance with the teachings of the present invention the fundamental structure just described may be easily and economically modified to convert it from a two axis magnetic field sensor to a three axis magnetic field sensor. Referring again to FIGS. 1 and 2, this modification comprises the addition of three vertical field sensors and magnetometer elements 25, 26 and 27 to the fundamental. It will be noted that these additional sensor elements are perfectly symmetrically disposed along the bisector of the pie-shaped region of base element 11 defined by the channels 23 which receive the legs 1, 2 and 3 and their arcuate collectors 9 and 10.

Figure 3:
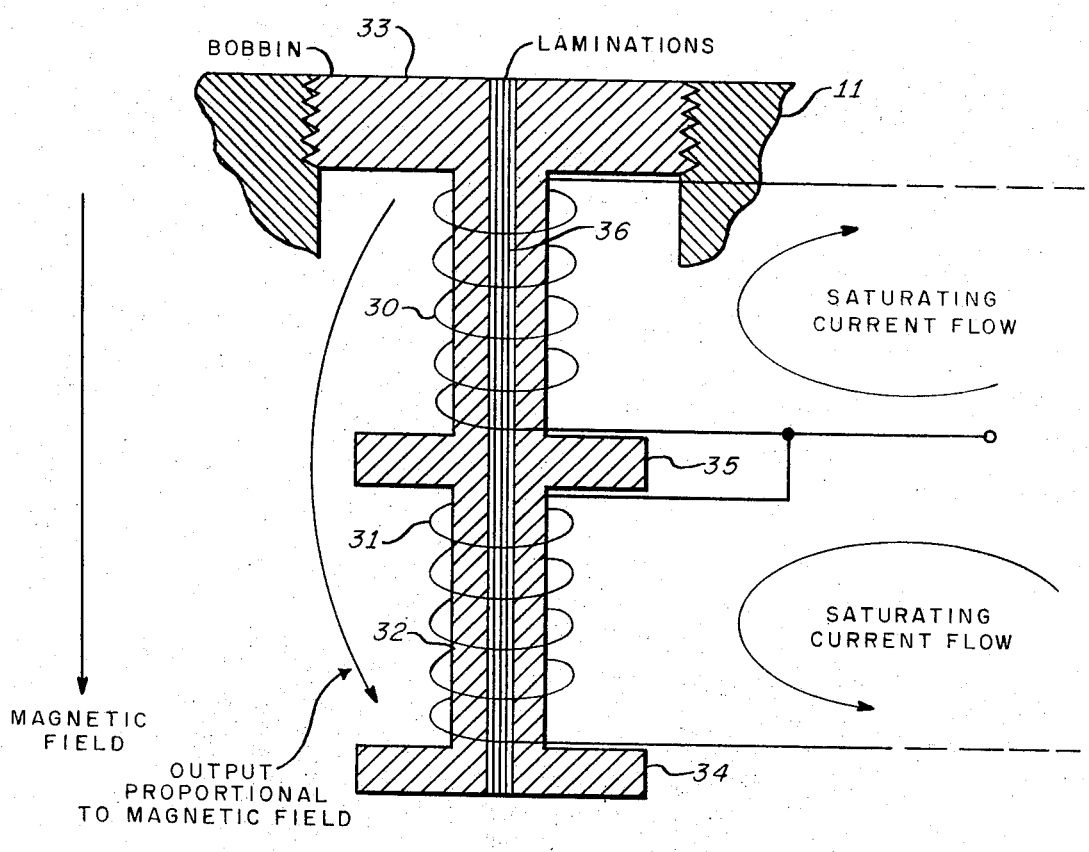
FIG. 3 is a detail showing the structure of one of the vertical field magnetometer sensors.

As shown in FIGS. 1 and 3 each of the vertical field sensor elements 25, 26, 27 comprises two coils 30, 31 wound on an insulated bobbin 32, such as insulated aluminum, having end flanges 33, 34 and dividing flange 35, the upper flange 33 being threaded as shown. Within a central or axial channel of the bobbin 32 and extending along its full length is a highly permeable magnetic core 36. In one embodiment the core material is comprised of a pair of thin ribbons of 4-79 Permalloy positioned within the bobbin and common to both coils.

The location and size of the vertical field sensors 25, 26, 27 is carefully chosen. As shown particularly in FIGS. 1 and 2, each coil is symmetrically positioned relative to the fundamental excitation coil 4 and pick-up windings 7 of each leg of the fundamental and also preferably as far away as possible therefrom. Yet, the sensors 25, 26 and 27 are not positioned so far out toward the periphery of the base 11 that their length, required for adequate signal output, extends significantly beyond the external surface of pendulous mass 14 when the invention is used in a pendulous embodiment. The base 11 is therefore drilled out perfectly parallel with the vertical axis A of the valve fundamental at the locations shown to provide three vertical channels within the base 11. The top interior edge of each channel is tapped to a depth approximately equal to the thickness of the threaded flange 33 so that when assembled into the channels, the furface of each sensor 25, 26, 27 is substantially flush with the top of base 11. The sensor winding leads may be brought out through the ends of the bobbins as schematically indicated for connection to electrical circuits as will be described below. After the vertical field sensors are initially installed, the permalloy strips 36 are carefully periodically positioned so as to reduce harmonics while retaining an adequate signal output. When they are finally fully adjusted and calibrated, the strips 36 are sealed in place using a suitable embedment such as silicone rubber or silastic.

Again, the purpose of the three dual coil vertical field sensors in place of but one is to obtain a small package, have minimum interaction between the horizontal and vertical field sensors and to obtain an error averaging effect; for example an apparent single coil effect that is unaffected by heading. This averaging effect greatly reduces or eliminates any "shading" of the vertical sensors 25, 26, 27 by the permalloy material of the horizontal legs 1, 2, 3 which would otherwise result in the vertical field sensor outputs being dependent upon the azimuthal orientation of the horizontal field sensors. The sensor is non-magnetizable, as in the valve of U.S. Pat. No. 3,573,610 since the total permalloy in the horizontal and vertical sensing sections are in the saturation circuits. This saturating of both circuits removes any residual magnetism that would tend to remain in the permalloy.

When the vertical field sensors 25, 26, 27 are employed in a pendulously mounted flux valve for computing, for example, Coriolis and centripetal acceleration compensating signals as taught in the above reference U.S. Pat. No. 2,852,859 but using an actual measure of the vertical magnetic field component rather than deriving it as a function of latitude, etc., it is only necessary to drill out holes in the periphery of the bass pendulous mass 14 to accommodate the lower ends of the sensors 25, 26, 27 as shown typically at 40 in FIG. 1.

Figure 4:
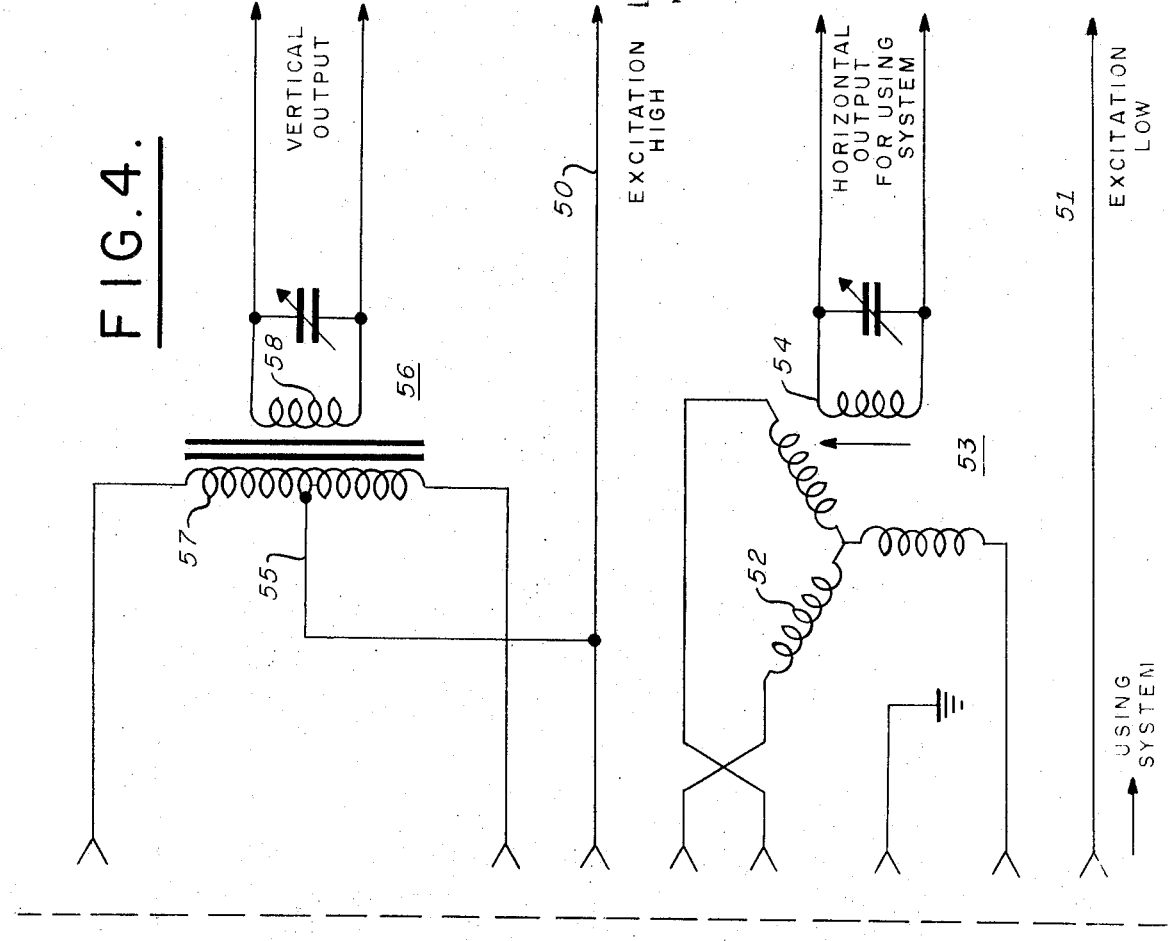
FIGS. 4 an 5 are typical wiring diagrams of the sensor, FIG. 4 showing the vertical field sensors connected in parallel, and FIG. 5 showing these sensors connected in series.
Figure 4:
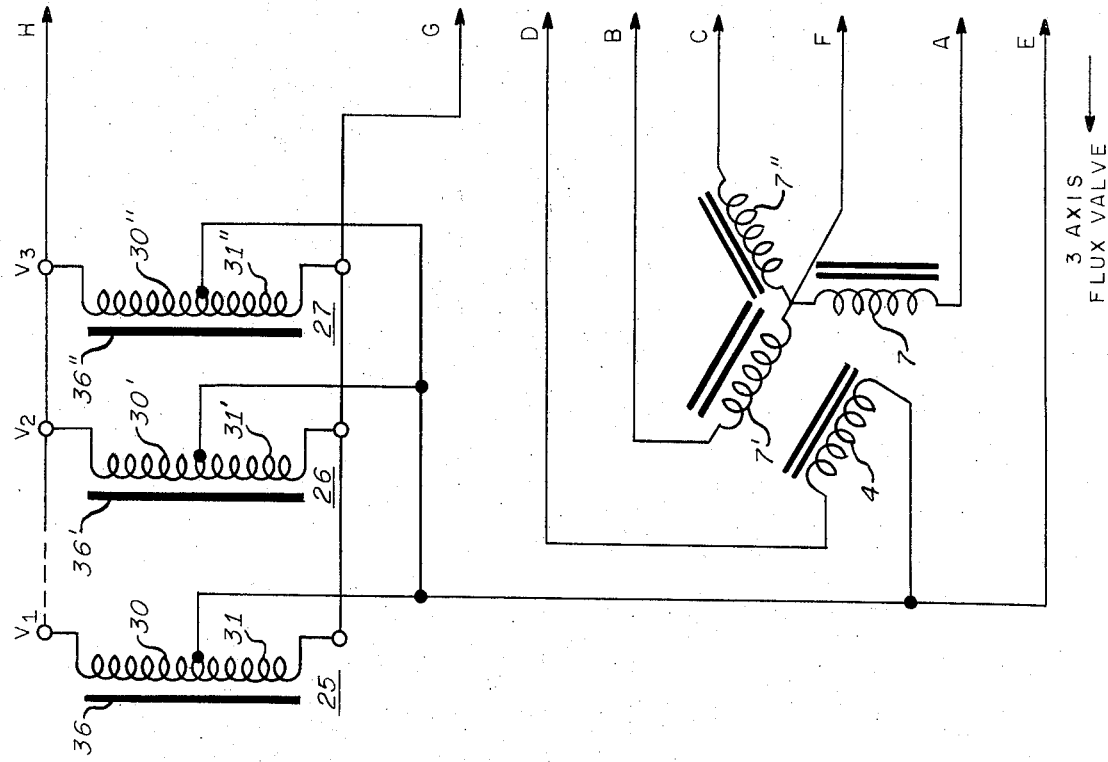
Figure 5:
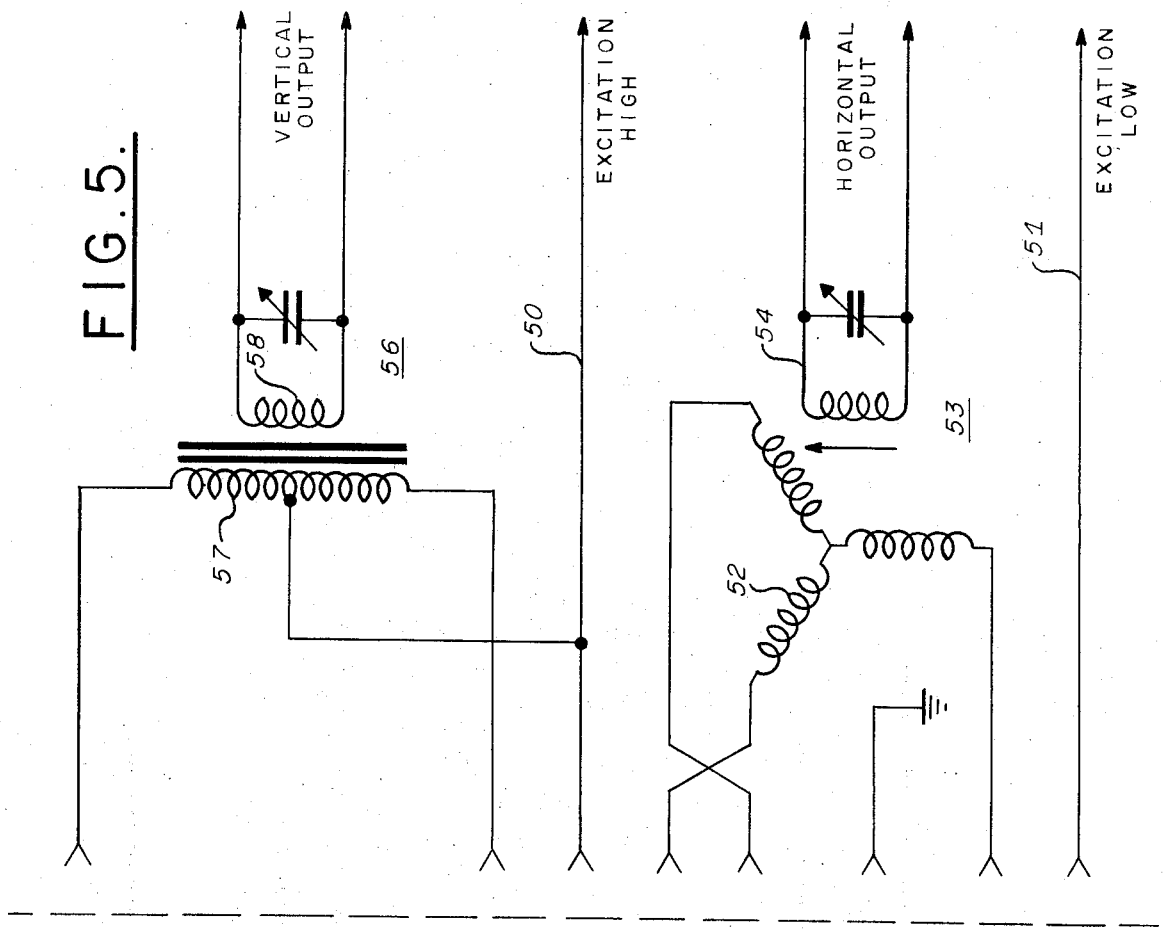
Figure 5:
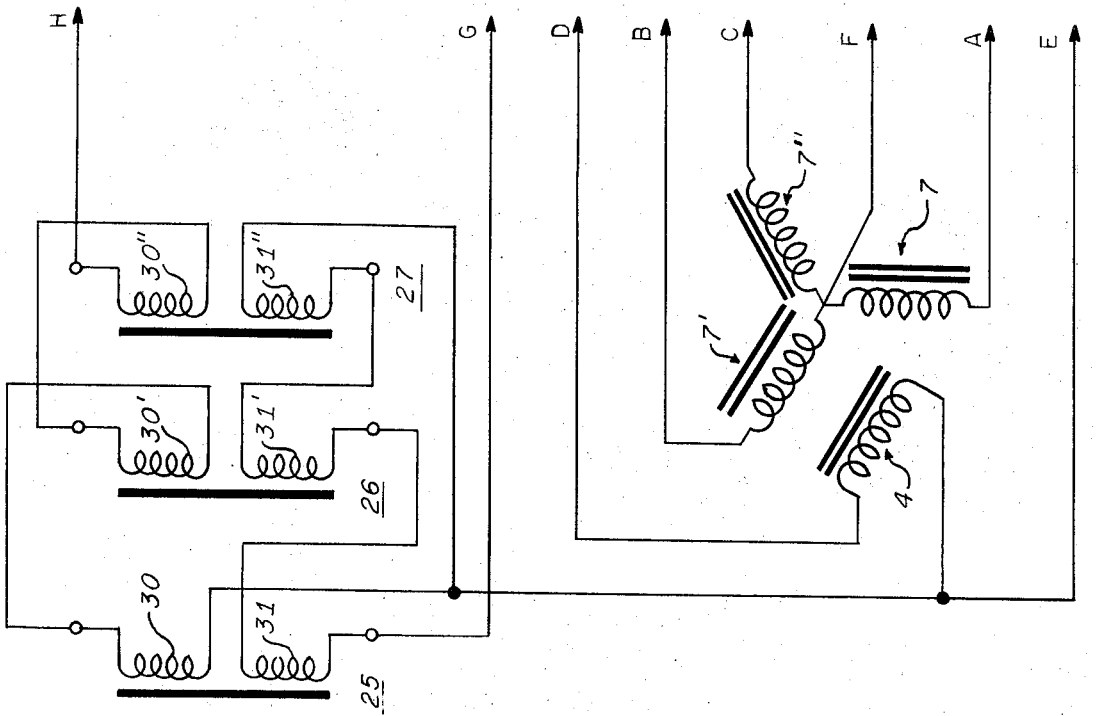

The electrical connections of the vertical field sensors 25, 26, 27 and their electrical relationship with the excitation coil 4 and pick up coils 7 of the fundamental is shown schematically in FIGS. 3, 4 and 5. In FIGS. 4 and 5, the electrical interconnection of the excitation and pick-up coils of the fundamental flux valve are identical and the over-all operation thereof is essentially the same as and fully taught in any of the above U.S. Pat. Nos. 2,383,460; 2,853,859 and 3,573,610. Briefly, the excitation winding 4 is excited with 400 Hz single phase supply voltage applied to leads 50 and 51 which cyclically varies the reluctance of the cores of legs 1, 2 and 3, that is, to periodically saturate and unsaturate the core material and thereby effectively "open" and "close" the valve to any magnetic field component parallel with the core legs. The pick-up windings 7, 7', 7" sense the magnetic field component coupled therein and will generate a double or 800 Hz alternating voltage proportional in amplitude to the magnitude of said component. The pick-up or output windings 7, 7', 7" are connected to corresponding windings of the stator 52 of receiver synchro 53, the rotor 54 of which will have generated in its single winding a voltage corresponding to the resultant of the magnetic field components sensed by the windings 7, 7', 7"; this resultant being identified in the pendulous embodiment as the flux valve horizontal output. This signal may be used by any number of types of user systems, some of which are illustrated in the above-referenced patents. It will be understood that the user system includes an 800 Hz reference voltage (not shown) for processing the horizontal output from synchro receiver 53.

In the electrical schematic foe FIGS. 3 and 4, the vertical field sensors 25, 26, 27 are connected in parallel, the opposite ends of dual coils 30, 31; 30', 31'; 30", 31" being connected together and the inner ends thereof also being connected together. The high side of the 400 Hz single cycle supply for the fundamental excitation winding 4 is connected to the center tap 55 of the primary 57 of a transformer 56, the outer terminals thereof being connected to the common outer ends of coils 30, 31; etc. The common inner ends of coils 30, 31; etc. are connected to the other or lower side of the excitation supply.

Thus, as shown in FIG. 3, saturating currents flow in opposite directions through the upper and lower coils 30, 31; etc. thereby alternately saturating and unsaturating, i.e., "closing" and "opening" the sensor to the component of the local magnetic field normal to that sensed by the fundamental. Since the excitation current flow in opposite directions through the primary transformer winding 57 no output due to this excitation will appear across secondary winding 58 of transformer 56. However, while the sensor is "opening and closing," the unidirectional magnetic field component coupled through the permalloy core 36, 36', 36'' will generate a current through both windings 30, 31; etc. producing a resultant voltage across primary 55 which couples directly into secondary 58 to provide an output voltage proportional to the magnitude of that magnetic field component. This output may be identified as the vertical output of the three axis sensor.

The electrical schematic of FIG. 5 shows the vertical field sensors 25, 26, 27 in series connection. In this case, the upper coilss 30, 30', 30'' are connected in series with one side of transformer primary 57 and the lower coils 31, 31', 31'' are connected in series with other side of the primary 57. The operation of the vertical field sensors in this series modification is the same and need not be described in detail. While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A magnetic field responsive device comprising
   a. a first flux valve means including at least three magnetic field sensing elements equiangularly disposed in a common plane about a central axis for providing output signals proportional to correspondingly disposed components of said magnetic field lying in said plane, and
   b. second flux valve means including at least three magnetic field sensing elements disposed symmetrically between said first flux valve elements and oriented normal to said common plane for supplying an output signal proportional to components of said magnetic field normal to said plane.

2. The device as set forth in claim 1 wherein the sensing elements of said first flux valve means are radially equiangularly disposed and include a common energizing coil means centrally positioned relative thereto and wherein said second flux valve elements are disposed symmetrically between said first flux valve elements whereby to minimize any unsymmetrical cross coupling effecting between said energizing coil means and said second flux valve elements.

3. The device as set forth in claim 1 wherein said first flux valve means includes a generally circular, relatively thick, non-magnetic base member including means for supporting said first flux valve elements therein and in said common plane and wherein each said second flux valve elements comprise an elongated magnetic core and winding member, and means for mounting each of said core and winding member in said base member with their long dimension perpendicular to said base plane.

4. The device as set forth in claim 3 wherein the thickness of said base member extends above and below said first flux valve supporting means and said second flux valve core and winding members extends through the thickness of said base member to minimize the thickness of the overall device.

5. The device as set forth in claim 4 further including
   a. a housing having an upper support wall and a generally spherical bottom wall,
   b. means on the upper side of said base member for pivotally supporting said base member on said upper housing wall for freedom of angular movement about a pair of orthogonal axes parallel to said plane, and
   c. a partial spherical mass secured to the lower side of said base member for imparting pendulous moments to said base member whereby to maintain said base member in a substantially horizontal plane.

6. The device as set forth in claim 3 wherein said mounting means for said core and winding members includes holes found in said base member perpendicular to said plane and means for securing said core and winding members within said holes.

7. The device as set forth in claim 3 wherein each of said core and winding members includes an elongated bobbin having an axial hole therethrough and a winding supported thereon, and a plurality of strips of high permeability magnetic material disposed within said hollow bobbin.

8. A magnetic field responsive device comprising
   a. a magnetic core having at least three arms relatively equiangularly spaced about a central axis and disposed in a single plane,
   b. energizing coil means positioned centrally of said core means with its magnetic axis perpendicular to said plane and adapted to be energized from a source of alternating current,
   c. pick-up coil means positioned on each of said arms and responsive to the energization of said energizing coil means and to the components of said magnetic field in said plane for supplying corresponding outputs proportional to the magnitude of said components,
   d. at least three second magnetic core elements disposed symmetrically between the arms of said first mentioned core means, the orientation of said core elements being such as to be sensitive to components of said magnetic field normal to said first mentioned magnetic field components and
   e. second coil means positioned on each of said latter core elements and energizable from said alternating current source and responsive to components of said magnetic field normal to said first mentioned components for supplying outputs proportional to the magnitude of said normal magnetic field components.

9. The device as set forth in claim 8 wherein each of said second coil means includes a pair of coils and means for alternately energizing said coils in opposite senses to thereby alternately saturate and unsaturate said core elements, and means for sensing currents across both of said coils in response to said normal magnetic field components.

10. The device as set forth in claim 8 wherein said first energizing coil means is supplied with an a.c. voltage of a first frequency and said outputs of said pick-up coil means is of a frequency double said a.c. frequency and wherein each of said second coil means is energized from said a.c. voltage and said outputs of each of said second coil means is also double said a.c. frequency.

11. The device as set forth in claim 10 wherein each of said second coil means is connected in parallel with said first energizing coil means.

12. The device as set forth in claim 10 wherein each of said second coil means is connected in series with said first energizing coil means.

* * * * *